Oct. 8, 1963 H. F. WELSH 3,106,264

PROTECTIVE RELEASE MECHANISM

Filed June 28, 1960

INVENTOR.
HERBERT F. WELSH

BY Edward M. Farrell

United States Patent Office 3,106,264

Patented Oct. 8, 1963

3,106,264

PROTECTIVE RELEASE MECHANISM

Herbert Frazer Welsh, Philadelphia, Pa., assignor to Sperry Rand Corporation, New York, N.Y., a corporation of Delaware Filed June 28, 1960, Ser. No. 39,406
14 Claims. (Cl. 188—42)

This invention relates to a mechanical system for positioning a magnetic head over a selected portion of a magnetic drum, and more particularly to means for eliminating the likelihood of damage to moving elements in the positioning system.

The use of magnetic drums for storage devices is well known. Such magnetic drums generally involve mass storage of data in the form of magnetized areas on the surface of the drums comprising binary coded signals. A portion of a drum's surface which passes beneath a magnetic reading or writing head is called a track. A single magnetic drum may include as many as one thousand or more tracks. In order to attain quick random access to the stored informatin as well as in the interest of economy, it is often desirable to use a single magnetic head for reading or writing information from on one of a number of tracks on a drum. When a single head is used for reading or writing information on a number of tracks, it is necessary to move the magnetic head to precisely position it over a selected track before the reading or writing operation is commenced.

The present invention relates to a positioning system in which the fine positioning of the magnetic head over a particular selected track includes a notched bar or rack which extends along the length of carriage travel. The distance between two teeth or notches of the rack may correspond to the distance occupied by a predetermined number of tracks, for example ten, on the magnetic drum. Coarse or rough positioning of the magnetic head to an area between two selected teeth of the rack is first achieved by moving the head carrying carriage, which carries the magnetic head, to the desired sector by suitable means, for example, by the use of a cable and pulley arrangement. When the carriage is roughly positioned, the rack, adapted to be moved a number of discrete distances corresponding to the number of tracks in a tooth sector, provdes a fine positioning of the carriage. The rack is responsive to be moved to an exact position by a coded signal and the carriage is moved to engage one of the teeth of the rack to precisely position the magnetic head over the selected track on the drum.

In the aforementioned system, rough positioning of the carriage may be first obtained by causing a pawl mechanism attached thereto to drop between the pair of teeth in the rack. The fine positioning is then attained by movement of the rack to a desired position, and then moving the pawl mechanism, by a servo motor or other means, to engage one of the teeth of the rack.

In such a system, as mentioned, involving a movable carriage and a toothed positioning rack, it is necessary that the carriage be free to move in a direction along the length of the rack except during the actual positioning operation. In high speed positioning systems, excess motion between the rack and the carriage when the pawl mechanism is coming into position or leaving position is often present. It is desirable during these times of excess motion that the likelihood of damage to any of the mechanical elements involved, as a result of physical contact, be minimized.

It is an object of this invention to provide an improved mechanism for minimizing the possibility of damage to positioning elements during high speed travel of a carriage.

It is a further object of this invention to provide an improved mechanism for positioning a head carrying carriage over a selected track of a drum while minimizing the possibility of damage to the positioning elements as a result of accidental physical contact resulting at high speeds.

It is still a further object of this invention to provide an improved system including a toothed rack for fine positioning of a carriage wherein damage to the teeth of the rack or carriage resulting from excessive relative motion therebetween is minimized.

In accordance with the present invention, a positioning system is provided which includes a movable carriage for carrying a magnetic head and a toothed rack for fine positioning of the magnetic head. A retractable pawl mechanism is attached to the carriage and disposed to engage one of the teeth of the rack when the pawl mechanism is in an extended position. When the pawl mechanism is in a retracted position, it is disengaged from any of the teeth of the rack to permit free movement between the carriage and rack. When the pawl mechanism engages one of the teeth of the rack and the relative motion between the carriage and rack exceeds a predetermined limit, the pawl mechanism is retracted away from the rack. Resilient means may be provided to continuously urge the pawl mechanism toward the rack whereby the pawl mechanism may ride over the teeth of the rack without causing damage to the positioning elements while the pawl mechanism seeks a selected area between two teeth of the rack.

Other objects and advantages of the present invention will be apparent and suggest themselves to those skilled in the art, from a reading of the following specification and claims in conjunction with the accompanying drawing, in which:

Figure 3A:
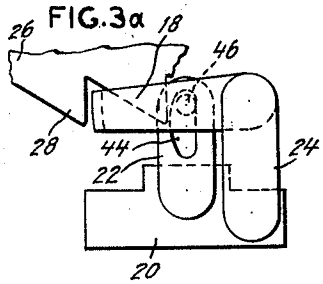
Figure 3B:
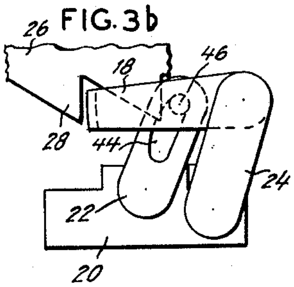
Figure 3C:
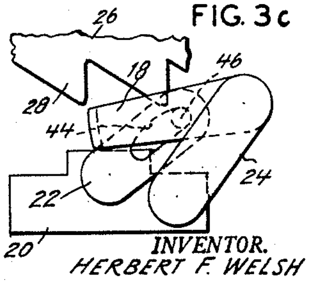

FIGURES 3*a*, 3*b* and 3*c* are views of the pawl mechanism illustrating the protective feature of the present invention.

Figure 1:
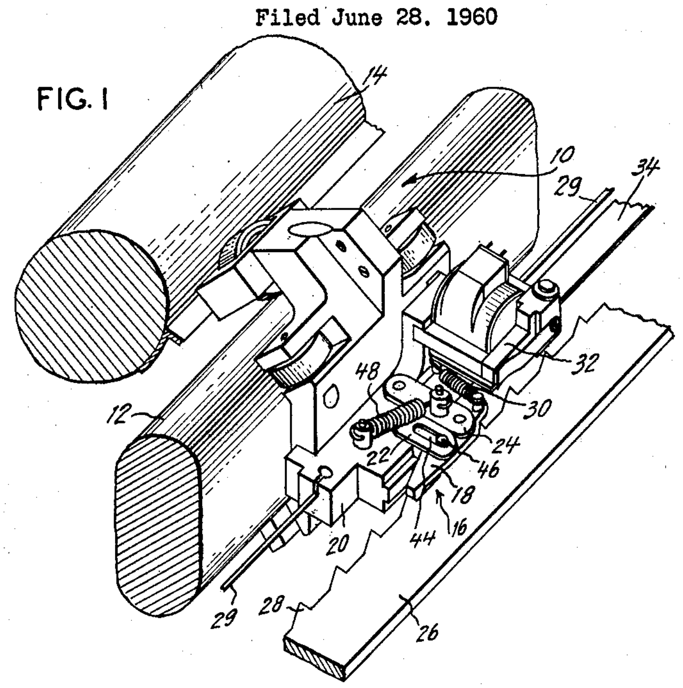
FIGURE 1 is an isometric view illustrating a positioning system, in accordance with the present invention.

Referring particularly to FIGURE 1, a carriage mechanism 10 includes a plurality of rollers for riding on a rail element 12. The carriage mechanism 10 normally includes various magnetic head members which are adapted to be lowered over a selected track of a magnetic drum by means of the actuation of a bail element or lowering tube 14. The magnetic head elements and the magnetic drum and various other details relating to the complete system are not illustrated since they are not primarily directed towards the present invention.

A retractable pawl mechanism 16 includes a pawl arm 18 pivotally mounted to a carriage element 20 through a pair of link members 22 and 24. Link member 24 is pivotally mounted to carriage element 20 at a pivot point 38. When the carriage mechanism 10 is being moved along the rail element 12, the pawl arm 18 is held by biasing means in a retracted position away from the teeth 28 of a positioning rack 26. The positioning rack 26 includes a plurality of equally spaced teeth or notches with the length of the sector between two of the teeth corresponding to the distance occupied by a predetermined number of tracks on a drum. The carriage mechanism 10 is moved by a drive cable 29 during the rough or coarse positioning operation. The drive cable 29 may be connected to means (not illustrated) which are responsive to a coded signal to move the carriage mechanism 10 to a selected area between two teeth of the positioning rack 26. The drive cable 29 may move the carriage in two directions. After the fine positioning is accomplished the drive cable forces the pawl 18 against a selected tooth of the rack 26. Thus, it is seen that a first coded signal may be employed to roughly position the carriage mechanism 10 close to the track to be selected on the magnetic drum.

When the carriage mechanism 10 is roughly positioned between the two selected teeth of the rack 26, the pawl arm 18 is caused to become extended and drops in the area between the two selected teeth. Dropping of the pawl arm 18 between the two selected teeth is caused by actuation of a tension spring 30 which urges the pawl arm 18 toward the rack 26. A solenoid 32, designed to be operated by an electrical signal, is provided to produce the tension in the spring 30, as is more clearly illustrated in FIGURE 2.

After the carriage mechanism 10 is roughly positioned, it is ready for fine positioning by means of the fine positioning of the rack 26. The rack 26 may be connected to mechanical means (not illustrated) to be moved in accordance with a coded signal. As has been pointed out, the rack 26 may be adapted to be moved through a number of discrete distances. When the rack 26 is precisely positioned, a servo mechanism (not shown) may be employed to move the drive cable 29 to force the pawl mechanism 16 to be moved to the left until the pawl arm 18 directly engages one of the teeth 28 of the rack 26. At this point, the carriage mechanism is properly positioned and an associated magnetic head is precisely positioned over a selected track of a magnetic drum. The magnetic head may then be lowered into position and made ready to perform a reading or writing operation.

The band 34 may be connected to a position potentiometer for indicating the actual position of the carriage during operation. Since this feature is not important to the present invention, it is not shown or described in detail.

Figure 2:
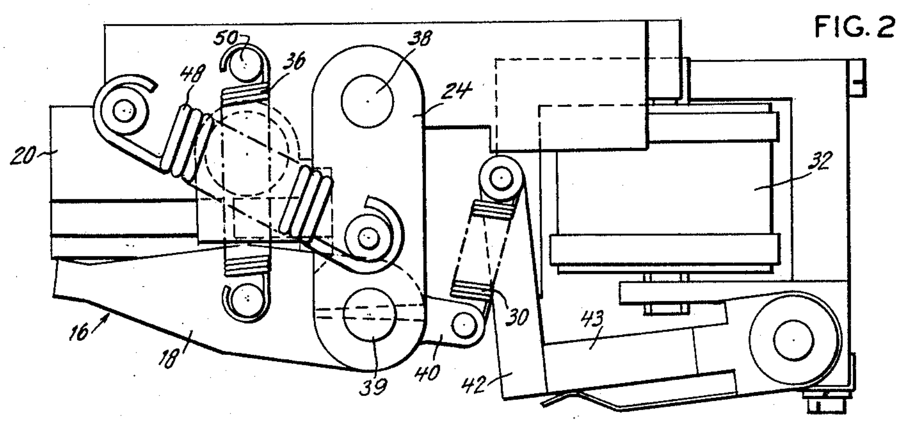
FIGURE 2 is an enlarged side view of a portion of the pawl mechanism illustrated in FIGURE 1.

Referring particularly to FIGURE 2, the pawl mechanism 16 is illustrated with its pawl arm 18 in a retracted position. A spring member 36 is suitably connected between the central portion of the pawl arm 18 and the carriage element 20. The spring member 36 is normally under tension to hold the pawl arm in an out or retracted position away from the rack 26 (FIGURE 1). The pawl arm 18 is pivotally mounted to the link member 24 at a pivot point 39. The end of the pawl arm 40 is connected to the spring 30. When the solenoid 32 is actuated by an electrical signal, an extended member 42 to which the spring 30 is attached is forced to be moved in an upward direction. The extended member 42 is connected to arm 43 which is actuated by the solenoid 32. This causes tension in the spring 30 which pulls up the end 40 of the pawl arm 18. The tension produced by the spring 30 is sufficient to overcome the tension produced by the spring 36 which tends to hold the pawl arm 18 in a retracted position. When the solenoid 32 is actuated, therefore, the pawl arm 18 rotates to an extended position about its pivot point 39 with the free end of the pawl arm 18 becoming disposed to engage one of the teeth of the positioning rack.

It is noted in FIGURE 1 that the link member 22 disposed intermediate the free end of the pawl arm 18 and the link 24, includes an elongated slot 44 adapted to receive an engaging pin member 46 which is fixedly mounted to the pawl arm 18. When the free end of the pawl arm 18 is retracted or extended, the engaging pin member 46 rides longitudinally within the elongated slot. For lateral movements of the pawl arm 18, the pin 46 forces the link 22 to be angularly moved. The link member 22 with its elongated slot makes it possible for the pawl arm 18 to be extended or retracted about its pivot point 39 at the start of a positioning or withdrawal operation without affecting the operation of the link member 22.

Thus the spring member 36 provides means for maintaining the pawl arm 18 in a retracted position while the spring member 30, when actuated, provides means for maintaining the pawl arm 18 in an extended position. These operations are obtained without substantial interference from the protective mechanism provided by the link 22. A third spring 48, connected between the carriage element 20 and the link member 24, provides means for maintaining the link member 24 substantially perpendicular to the carriage element 20 when the pawl mechanism is in an extended position. Let us now consider the operation of the protective feature involved in the present invention which is primarily directed to the link member 22 and its associated element.

Referring particularly to FIGURES 3*a*, 3*b* and 3*c*, the rack 26 is illustrated as being in the form of a saw-tooth shaped element slightly different in form than the teeth 28 illustrated in FIGURE 1. The particular shape of the teeth or notches of the rack 26 is not critical and the basic operation of the protective feature included in the present invention is not affected by slightly different types of rack configurations.

The pawl arm 18, in FIGURE 3*a*, is illustrated in an extended position and engages one of the teeth of the rack 26. Assume now that the rack 26 is moving to the right with respect to the carriage element 20. If this movement exceeds a predetermined limit, the movement of the rack 26 causes one of the teeth of the rack to physically engage the pawl arm 18 and force it to be moved to the right. When the pawl arm is forced to be moved to the right, the links 22 and 24 are caused to move in a clockwise direction. The link member 22, which is designed to disengage the free end of the pawl arm away from the rack 26, is shorter than the link 24. Because of this, the link member 22 will move through a greater angle than the link 24 when both are moved simultaneously by the pawl arm 18. FIGURE 3*b* illustrates the direction of the movement of the links 22 and 24 caused by the relative movement of the rack 26 to the right with respect to the carriage element 20.

Continued movement of the rack 26 to the right finally causes the pawl arm 18 to be completely retracted or disengaged from the area between the teeth of the rack 26. This condition is illustrated in FIGURE 3*c*. In its disengaged or "toggled out" position, further movement of the rack 26 will not affect the carriage element 20.

The springs 48 and 30 (FIGURE 2) force the pawl arm 18 to become extended again after it has passed over one of the teeth of the rack. It is thus seen that any excess relative motion between the rack 26 and the carriage element 20 causes the pawl arm 18 to be retracted away from the rack. Due to the resilient type of engaging arrangement, provided by the various springs, the likelihood of damage to the pawl arm 18 or to the rack 26 as a result of excessive relative motion therebetween is minimized. This excessive motion may occur especially at two critical times, such as when the pawl arm 18 is coming into position with the rack 26 or when the pawl arm is leaving the rack. At these times the rack and carriage element may be moving in opposite directions.

It is noted that if the rack 26 is being moved to the left, the pawl arm 18 will ride over the sloped portion of the toothed rack and be automatically retracted. Regardless of the direction of carriage movement, it is seen that the protective feature provided by the link 22 and its associated elements is effected to minimize physical damage resulting from accidental contact between moving parts.

Various means may be employed to assure that the pawl arm 18 does not become retracted until the relative motion between the rack 26 and the carriage 20 is beyond some predetermined limit, if desired. For example, as was noted in FIGURE 1, the final positioning of the pawl arm 18 may be caused by the operation of a servo motor attached to the drive cable 29 to move the pawl arm 18 against one of the teeth of the rack 26. Here it is apparent that the force exerted by the servo motor should not be sufficient to cause the pawl arm 18 to be retracted.

It is noted that the link member 24 may be in the form of an H frame member with a spring, such as the spring 48, being connected to both sides of the frame member. The spring 36 may be connected to a pin 50 (FIGURE 2) and centrally spaced between the two sides of the pawl arm 18.

What is claimed is:

1. In combination with a carriage and a rack, an extendible mechanism attached to said carriage disposed to selectively engage said rack when in an extended position and to be disengaged from said rack when in a retracted position, an actuating device for actuating said mechanism to engage or disengage said rack, and an element on said carriage responsive to relative motion between said carriage and said rack to cause said mechanism to be retracted from an extended position away from said rack when said relative motion exceeds a predetermined limit.

2. In combination with a movable carriage and a positioning rack, a positioning system comprising a pawl attached to said carriage disposed to selectively engage said positioning rack when said pawl is in an extended position and to be disengaged from said positioning rack when said pawl is in a retracted position, an actuating device for actuating said pawl to engage or disengage said positioning rack, and a device on said carriage responsive to relative motion between said carriage and said rack to cause said pawl to be retracted from an extended position away from said rack when said relative motion exceeds a predetermined limit.

3. In combination with a movable carriage and a positioning rack having a plurality of protruding elements, a pawl pivotally mounted to said carriage disposed to selectively engage one of said protruding elements of said positioning rack when said pawl is in an extended position and to be disengaged from said protruding elements of said positioning rack when said pawl is in a retracted position, an actuating device for actuating said pawl to engage or disengage one of the elements of said positioning rack, and a mechanical element on said carriage responsive to relative motion between said carriage and said rack to cause said pawl to be retracted from an extended position away from said rack when said relative motion exceeds a predetermined limit.

4. A positioning system for positioning a movable carriage by means of a toothed positioning rack comprising a pawl arm pivotally mounted to said carriage and having a free end disposed to selectively engage one of the teeth of said positioning rack when said pawl arm is in an extended position and to be disengaged from said positioning rack when said pawl arm is in a retracted position, an electrical device for actuating said pawl arm to engage or disengage one of the teeth of said positioning rack, and a spring biased element on said carriage responsive to relative motion between said carriage and said rack to cause said pawl arm to be retracted from an extended position away from said rack when said relative motion exceeds a predetermined limit.

5. A system for positioning a movable carriage including a toothed rack comprising a pawl mechanism disposed to engage one of the teeth of said rack when said pawl mechanism is extended and disengaged from said rack when said pawl mechanism is retracted, an engaging means connected to said pawl mechanism, means for actuating said pawl mechanism to engage or disengage said rack, a link member having an elongated slot mounted to said carriage, said elongated slot disposed to receive said engaging means of said pawl mechanism to permit longitudinal movement therein, said engaging means and said link member being responsive to relative motion between said carriage and said rack to cause said pawl mechanism to be retracted from an extended position.

6. A system for positioning a movable carriage comprising a toothed positioning rack, a pawl mechanism disposed to engage one of the teeth of said rack when said pawl mechanism is extended and disengaged from said rack when said pawl mechanism is retracted, an engaging means connected to said pawl mechanism, means for actuating said pawl mechanism to cause said pawl mechanism to be extended or retracted, a link member having an elongated slot mounted to said carriage, said elongated slot disposed to receive said engaging means of said pawl mechanism to permit longitudinal movement therein, said engaging means being responsive to relative motion between said carriage and said rack to force said link member to be angularly moved to cause said pawl mechanism to be retracted from an extended position.

7. A system for positioning a movable carriage comprising a toothed positioning rack, a pawl mechanism disposed to engage one of the teeth of said rack when said pawl mechanism is extended and disengaged from said rack when said pawl mechanism is retracted, an engaging element connected to said pawl mechanism, means for actuating said pawl mechanism to engage or disengage said rack, a link member having an elongated slot mounted to said carriage, said elongated slot disposed to receive said engaging element of said pawl mechanism to permit longitudianl movement therein, said engaging element being responsive to force exerted by one of the teeth of said positioning rack against said pawl mechanism to angularly move said link member to cause said pawl mechanism to be retracted from an extended position.

8. In combination with a movable carriage and a toothed positioning rack, a pawl arm pivotally mounted to said carriage and having two ends, a free end of said pawl arm being disposed to engage one of the teeth of said positioning rack when said pawl arm is in an extended position and to be disengaged from said positioning rack when said pawl arm is in a retracted position, an engaging pin connected to said pawl arm, means for actuating said pawl arm to engage or disengage said positioning rack, a first link member pivotally connected toward the other end of said pawl arm between said carriage and said pawl arm, a second link member shorter in length than said first link member pivotally mounted at one end to said carriage, said second link member having an elongated slot for receiving said engaging pin of said pawl arm to permit longitudinal movement therein, and said pin and said second link being responsive to relative motion between said carriage and said rack to force said pawl arm to be retracted from an extended position away from said rack.

9. In combination with a movable carriage and a toothed rack, a positioning system comprising a pawl arm pivotally mounted to said carriage and having two ends, one of said two ends being free and disposed to engage one of the teeth of said positioning rack when said pawl arm is in an extended position and to be disengaged from said positioning rack when said pawl arm is in a retracted position, an engaging pin connected to said pawl arm, means for actuating said pawl arm to engage or disengage said positioning rack, a first link member pivotally connected toward the other end of said pawl arm between said carriage and said pawl arm, a second link member shorter in length than said first link member pivotally mounted at one end to said carriage, said second link member being disposed intermediate said free end of said pawl arm and said first link member, said second link member having an elongated slot for receiving said engaging pin of said pawl arm to permit longitudinal movement therein, and said pin and said second link being responsive to relative motion between said carriage and said rack to force said pawl arm to be retracted from an extended position away from said rack.

10. The invention as set forth in claim 9 wherein said first and second link members are disposed in a parallel relationship with each other and at right angles to said pawl arm when said pawl arm is in an extended position and are angularly moved to retract said pawl arm when force exerted by one of said teeth against the free end of said pawl arm exceeds a predetermined limit.

11. The invention as set forth in claim 10 wherein said first and second link members are angularly moved when one of said teeth exerts a force against said pawl arm with said second link member being moved through a greater angular distance than said first link member.

12. The invention as set forth in claim 9 wherein said pawl arm may be dropped between a pair of teeth of said rack during a coarse positioning of said carriage with said first and second link members remaining relatively fixed with respect to each other.

13. In a positioning system comprising a movable carriage and a movable rack, a mechanism associated with said carriage adapted to selectively couple said carriage to said rack, said mechanism comprising a link mechanism, said mechanism further comprising actuating means disposed to actuate said link mechanism, said link mechanism comprising a first, a second and a third link member, said third link member being disposed to engage said rack when in an extended position and to be disengaged from said rack when in a retracted position, said actuating means being operative to extend or to retract said third member, said first and said second link member being pivotably mounted to said carriage, said third member being pivotably connected to said first member, engaging means associated with said third member, said second member including an elongated slot adapted to receive said engaging means of said third member, first spring means connected to said third member tending to extend said third member, second spring means connected to said third member, said second spring means being of a force to overcome said first spring means and thereby keeping said third member in a retracted position, said actuating means being disposed to overcome the force of said second spring means when actuated and thereby to extend said third member toward said rack, said link mechanism being responsive to contact pressure arising from engagement of said third member with said rack causing said third member to become retracted from said rack if said contact pressure exceeds a preset limit determined by the balance of force between said first and said second spring means.

14. In combination with a carriage and a rack, first and second means attached to said carriage adapted to selectively couple said carriage to said rack, said first means comprising a member disposed to engage said rack when in an extended position and to be disengaged from said rack when in a retracted position, said second means being operative to extend or to retract said member, said first means being responsive to relative motion between said carriage and said rack to cause said member to become disengaged from said rack if said relative motion exceeds a pre-set limit of speed.

References Cited in the file of this patent

UNITED STATES PATENTS

| | | |
|---|---|---|
| 578,693 | Fay | Mar. 9, 1897 |
| 2,155,777 | Steffen | Apr. 25, 1939 |